(12) United States Patent
Alig (10) Patent No.: US 12,434,573 B2
(45) Date of Patent: Oct. 7, 2025

(54) VEHICLE WITH AN ELECTRIC ENERGY STORAGE DEVICE

(71) Applicant: Bayerische Motoren Werke Aktiengesellschaft, Munich (DE)

(72) Inventor: Robert Alig, Germering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/686,901

(22) PCT Filed: Sep. 14, 2022

(86) PCT No.: PCT/EP2022/075474
§ 371 (c)(1),
(2) Date: Feb. 27, 2024

(87) PCT Pub. No.: WO2023/041551
PCT Pub. Date: Mar. 23, 2023

(65) Prior Publication Data
US 2025/0128612 A1    Apr. 24, 2025

(30) Foreign Application Priority Data
Sep. 17, 2021 (DE) ............... 10 2021 124 050.6

(51) Int. Cl.
*B60L 50/60* (2019.01)
*B60L 58/19* (2019.01)
(Continued)

(52) U.S. Cl.
CPC ............. *B60L 50/66* (2019.02); *B60L 58/19* (2019.02); *H01M 4/366* (2013.01); *H01M 4/505* (2013.01);
(Continued)

(58) Field of Classification Search
CPC ........ B60L 50/66; B60L 58/19; B60L 3/0007; B60L 58/18; B60L 50/64; H01M 4/366;
(Continued)

(56) References Cited

U.S. PATENT DOCUMENTS 5,773,962 A  *  6/1998  Nor ..................... B60L 58/13
                                            320/122
8,844,661 B2 *  9/2014  Favaretto ............ B62D 25/025
                                            180/68.5
(Continued)

FOREIGN PATENT DOCUMENTS

DE    10 2013 209 069 A1    11/2014
DE    10 2014 018 445 A1     6/2015
DE       102019207355 A1  * 11/2020

OTHER PUBLICATIONS

International Search Report (PCT/ISA/210) issued in PCT Application No. PCT/EP2022/075474 dated Dec. 23, 2022 with English translation (6 pages).
(Continued)

*Primary Examiner* — Elim Ortiz
(74) *Attorney, Agent, or Firm* — Crowell & Moring LLP (57) ABSTRACT

A vehicle is provided with an electric energy storage device including a first sub-storage device for electric energy and a second sub-storage device for electric energy, the first sub-storage device and second sub-storage device being electrically connected together by a switch assembly. The first sub-storage device and the second sub-storage device each include at least one respective electrochemical storage cell, wherein the at least one electrochemical storage cell of the first sub-storage device has a stability-optimized cell chemistry, and the at least one electrochemical storage cell of the second sub-storage device has an output-optimized cell
(Continued)

chemistry. The at least one electrochemical storage cell of the first sub-storage device is arranged in an impact assembly of the vehicle.

19 Claims, 4 Drawing Sheets

(51) Int. Cl.
*H01M 4/02* (2006.01)
*H01M 4/36* (2006.01)
*H01M 4/505* (2010.01)
*H01M 4/525* (2010.01)
*H01M 4/58* (2010.01)
*H02J 7/34* (2006.01)

(52) U.S. Cl.
CPC ......... *H01M 4/525* (2013.01); *H01M 4/5825* (2013.01); *H02J 7/342* (2020.01); *H01M 2004/027* (2013.01)

(58) Field of Classification Search
CPC .... H01M 4/505; H01M 4/525; H01M 4/5825; H01M 2004/027; H01M 16/00; H01M 50/242; H01M 50/249; H02J 7/342; Y02E 60/10; Y02T 10/70
See application file for complete search history.

(56) References Cited

U.S. PATENT DOCUMENTS

| | | |
|---|---|---|
| 2013/0065118 A1 | 3/2013 | Chang et al. |
| 2014/0342216 A1* | 11/2014 | Kohlberger ........... H01M 16/00 429/158 |
| 2018/0134135 A1* | 5/2018 | Schroth ............... H01M 50/242 |
| 2019/0225093 A1* | 7/2019 | Li ....................... H01M 50/242 |
| 2021/0151728 A1* | 5/2021 | Hinterberger ....... H01M 10/425 |

OTHER PUBLICATIONS

German-language Written Opinion (PCT/ISA/237) issued in PCT Application No. PCT/EP2022/075474 dated Dec. 23, 2022 with English translation (11 pages).

German-language Search Report issued in German Application No. 10 2021 124 050.6 dated Sep. 9, 2022 with partial English translation (10 pages).

* cited by examiner

VEHICLE WITH AN ELECTRIC ENERGY STORAGE DEVICE

BACKGROUND AND SUMMARY

The invention relates to a vehicle with an electric energy storage device.

An electric energy storage device is an electrochemical energy storage device which is rechargeable and is suitable for storing electrical energy and providing electrical energy to loads, in particular loads in a vehicle, for example an electric motor of the vehicle.

Electric energy storage devices usually comprise a plurality of electrochemical storage cells which are electrically interconnected to each other in series and/or in parallel.

Vehicles with at least partially electrically operated drives, which use electric energy storage devices for supplying power to an electric motor, are known in the prior art. The performance features of vehicles of this kind are substantially determined by means of the cell chemistry used in the electric energy storage device.

The term "cell chemistry" describes the selected combination of materials within an electrochemical storage cell, in particular the type of materials used in the cathode and the anode and also possibly the type of electrolyte of the electrochemical storage cell.

A critical parameter in selecting a suitable cell chemistry is the achievable energy density, i.e., the achievable capacity of the electrochemical storage device with respect to the volume or to the weight of the electric energy storage device.

However, further parameters and requirements are increasingly being included in the design of electric energy storage devices in order to be able to provide an electric energy storage device that is optimized for the respectively envisaged application.

The reliability, cycle stability, service life and operational safety of the electric energy storage device and the limitation to chemical elements that can be obtained in a resource-saving manner and with a low ecological footprint are of particular importance in this connection.

However, an improvement in respect of these further parameters is often accompanied by a reduction in the achievable energy density. In addition, problems in respect of determining operationally relevant parameters, for example the state of charge, also referred to as SoC, arise with some types of cell chemistry.

DE 10 2014 018 445 A1 discloses a battery which comprises at least two cell groups which are electrically interconnected with each other and have different types of cell chemistry and also a method for operating this battery. The cell groups have, in particular, different voltage levels and are connected and disconnected depending on the temperature profile and/or power requirement that occur/occurs. Therefore, only optimization of the properties of the battery in terms of thermal loads that occur takes place.

The object of the invention is to provide a vehicle that has a powerful and flexibly usable electric energy storage device.

The object is achieved by a vehicle with an electric energy storage device, comprising a first partial storage device for electrical energy and a second partial storage device for electrical energy, wherein the first partial storage device and the second partial storage device are electrically interconnected with each other by means of a switching arrangement. The first partial storage device and the second partial storage device each comprise at least one electrochemical storage cell, wherein the at least one electrochemical storage cell of the first partial storage device has a stability-optimized cell chemistry, and the at least one electrochemical storage cell of the second partial storage device has a power-optimized cell chemistry.

The vehicle according to the invention therefore has an electric energy storage device which is suitable for various applications and situations during operation of the vehicle owing to the combination of a stability-optimized cell chemistry and a power-optimized cell chemistry.

Here and below, the term "stability-optimized cell chemistry" refers to a cell chemistry which is distinguished by high cycle stability and high intrinsic safety. In particular, an electrochemical storage cell with a stability-optimized cell chemistry has an at least reduced risk of thermal runaway, even in the case of mechanical damage to an electrochemical storage cell of this kind. Thermal runaway of an electrochemical storage cell with stability-optimized cell chemistry is preferably precluded.

The question of whether a cell chemistry is a stability-optimized cell chemistry can be checked by means of what is known as the nail penetration test. In this test, a nail with a diameter of, for example, 3 mm is moved at a rate of, for example, 8 cm per second along the Z direction through the storage cell being tested, with the storage cell being completely penetrated in the Z direction.

Here and below, the term "power-optimized cell chemistry" refers to a cell chemistry which is distinguished by a high energy density and/or the ability to be able to provide high quantities of energy in a short time, in particular owing to a high energy density.

The electric energy storage device is, in particular, a lithium-ion battery. Here and below, the term "lithium-ion battery" is a synonym for all designations customary in the prior art for lithium-containing galvanic elements and cells, such as lithium battery, lithium cell, lithium-ion cell, lithium-polymer cell and lithium-ion accumulator, for example. Rechargeable batteries (secondary batteries) are included in particular.

The first partial storage device and the second partial storage device can be arranged distributed in the vehicle. In other words, the first partial storage device and the second partial storage device do not have to have a common battery casing.

Each of the partial storage devices can additionally comprise subunits which each have at least one electrochemical storage cell of the respective cell chemistry.

The subunits of the partial storage devices can likewise be arranged distributed in the vehicle. In this way, optimal utilization of installation space available in the vehicle is possible, so that the total capacity of the electric energy storage device can be further increased, with the design of the vehicle remaining the same.

In this case, the switching arrangement is designed to electrically interconnect the subunits of the partial storage devices to each other.

The switching arrangement allows, in particular, interconnection of the first and second partial storage devices in series and/or in parallel. In other words, the switching arrangement defines which electrochemical storage cells of the electric energy storage device provide electrical energy and how they interact.

The at least one electrochemical storage cell of the first partial storage device can be arranged in an impact arrangement of the vehicle.

The term "impact arrangement" refers to a component of the vehicle which is arranged such that deformation of this component can be expected in the event of an accident. A component of this kind is also referred to as a crash-relevant component.

Owing to the use of a stability-optimized cell chemistry, the use of electrochemical storage cells in components of this kind is rendered possible without the risk of thermal runaway being increased in the event of an accident. In this way, the total capacity of the electric energy storage device can be increased further than would be possible if only the second partial storage device is used. In other words, additional capacity can be provided by means of the first partial storage device in installation spaces of the vehicle that were not previously usable for arranging electrochemical storage cells.

Components of this kind may be, for example, a roof, wheel housings, a component on the bottom side of the rear and/or a component in the vicinity of a bulkhead of the vehicle.

For example, the impact arrangement has a cavity or intermediate space in which the at least one electrochemical storage cell of the first partial storage device is arranged.

In one variant, the impact arrangement is a side sill of a battery casing of the second partial storage device. Side sills, also referred to as a crash frame, of this kind are arranged on an outer side of the battery casing and are configured, for example, as a hollow profile or honeycomb structure. Side sills of this kind are intended to be deformed instead of the actual battery casing in the event of an accident, so that at most a reduced, in particular no, mechanical load acts on the electrochemical storage cells in the interior of the battery casing. According to the invention, the cavities in the side sill can be filled with electrochemical storage cells of the first partial storage device since they themselves do not cause any thermal runaway in the case of deformation occurring. Therefore, the achievable total capacity of the electric energy storage device can be increased.

In one variant, the stability-optimized cell chemistry is also a cost-optimized cell chemistry. In other words, the electrochemical storage cells of the first partial storage device are more cost-effective than the electrochemical storage cells of the second partial storage device in this variant. In this way, it is possible for only storage cells that are more cost-effective to be adversely affected in the event of an accident owing to the arrangement of the more cost-effective storage cells in the impact arrangement, whereas at the same time the more expensive power-optimized cell chemistry can be protected and not subjected to any or subjected to at least only a smaller mechanical load.

The at least one electrochemical storage cell of the first partial storage device preferably has an electrode with a cathode active material which comprises a compound with an olivine structure.

Olivine compounds of this kind have rapid and reversible kinetics for incorporating lithium ions, this resulting in a high current-carrying capacity and an advantageous low-temperature behavior of the electric energy storage device. It is particularly advantageous for compounds with an olivine structure to be very stable, have a high cycle stability and allow high intrinsic safety of the electric energy storage device.

The compound with an olivine structure is, for example, iron phosphate, iron manganese phosphate, iron cobalt phosphate, iron manganese cobalt phosphate, manganese cobalt phosphate, cobalt phosphate, nickel phosphate, cobalt nickel phosphate, iron nickel phosphate, iron manganese nickel phosphate, manganese nickel phosphate, nickel phosphate or combinations of these. The compound with an olivine structure can also be any of the mentioned substances in combination with lithium.

In particular, the compound with an olivine structure is lithium iron phosphate (also referred to as "LFP"). LFP has an outstanding cycle stability and stability. In particular, electrochemical storage cells which use LFP as the cathode active material do not undergo any thermal runaway when mechanically damaged.

The at least one electrochemical storage cell of the second partial storage device preferably has an electrode with a cathode active material, which comprises a layered oxide.

The layered oxide can contain nickel and cobalt, in particular the layered oxide is a nickel manganese cobalt compound and/or a nickel cobalt aluminum compound.

The layered oxide can also contain further metals as are known in the prior art. In particular, the layered oxide can contain doping metals, for example, magnesium, aluminum, tungsten, chromium, titanium or combinations of these.

Lithium nickel manganese cobalt compounds are also known by the abbreviation NMC, and occasionally alternatively also by the technical abbreviation NCM. NMC as the cathode active material has an advantageous combination of desirable properties, for example a high specific capacity, a reduced cobalt content and a high high-current carrying capacity.

NMCs can be described using the general formula unit Li$\alpha$Ni$_x$Mn$_y$Co$_z$O2, where x+y+z=1, where $\alpha$ indicates the stoichiometric content of lithium and usually lies between 0.8 and 1.15. Specific stoichiometries are specified in the literature as three-digit numerals, for example NMC 811, NMC 622, NMC 532 and NMC 111. The three-digit numeral respectively indicates the relative content of nickel: manganese: cobalt. In other words, for example, NMC 811 is a cathode active material with the general formula unit LiNi0.8Mn0.1Co0.1O2, that is to say where $\alpha$=1.

Furthermore, what are known as lithium- and manganese-rich NMCs with the general formula unit Li1+$\epsilon$(Ni$_x$Mn$_y$Co$_z$)1-$\epsilon$O2 can also be used, where $\epsilon$ lies in particular between 0.1 and 0.6, preferably between 0.2 and 0.4. These lithium-rich layered oxides are also known as overlithiated (layered) oxides (OLO).

Lithium nickel cobalt aluminum compounds, which are known by the abbreviation NCA and can be described by the general formula unit Li$_a$Ni$_x$Co$_y$Al$_z$O2, where x+y+z=1, wherein a indicates the stoichiometric content of lithium and usually lies between 0.80 and 1.15, can be used for the at least one electrochemical storage cell of the second partial storage device.

The ratio of the capacity of the first partial storage device to the capacity of the second partial storage device can lie in the range of from 1:1.5 to 1:15. In other words, the second partial storage device, which has a power-optimized cell chemistry, can have a higher capacity than the first partial storage device, which has a stability-optimized cell chemistry. In this way, the volume-related and the weight-related losses in capacity can be reduced by the use of a stability-optimized cell chemistry, while the total capacity of the electric energy storage device remains high.

In addition, known vehicles that only have an electric energy storage device in line with the second partial storage device can be supplemented with a first partial storage device.

In particular, the capacity of the first partial storage device is designed such that the vehicle can cover the average distance that a user of the vehicle covers in one day purely using the first partial storage device, for example a distance in the range of from 20 to 60 km.

In order to achieve ranges of this kind, the capacity of the first partial storage device lies in particular in the range of from 10 to 50 kWh.

The higher the total weight of the vehicle, the higher the capacity of the first partial storage device can be selected to be in order to achieve a sufficient range.

In order to utilize the cycle stability of the stability-optimized cell chemistry, the second partial storage device can be a range extender of the first partial storage device when the switching arrangement is in a first operating mode.

As a range extender, the second partial storage device does not directly provide its power to a load of the vehicle in the first operating mode of the switching arrangement. Instead, the second partial storage device is used only to charge the first partial storage device. In this way, the number of complete charging and discharging cycles that the second partial storage device runs through can be reduced since the first partial storage device is preferably used.

The electric energy storage device can be designed such that the power provided by the electric energy storage device is provided solely by the first partial storage device or by the second partial storage device when the switching arrangement is in a second operating mode.

In other words, it is possible to choose between the performance properties of the first partial storage device and the second partial storage device independently of each other in the second operating mode. For example, the second partial storage device is used provided that there is a high power requirement, for example, during an acceleration process of the vehicle, while otherwise the first partial storage device is used in order to utilize the high cycle stability of the first partial storage device.

Furthermore, the electric energy storage device can have a composite charge/discharge curve when the switching arrangement is in a third operating mode, wherein the composite charge/discharge curve has a first charge range, in which the power of the electric energy storage device is specified by the first partial storage device, and a second charge range, in which the power of the electric energy storage device is specified by the second partial storage device.

Further advantages and properties of the invention can be found in the following description of preferred embodiments, which are not intended to be understood in a limiting sense, and the figures, in which:

DETAILED DESCRIPTION OF THE DRAWINGS

Figure 1:
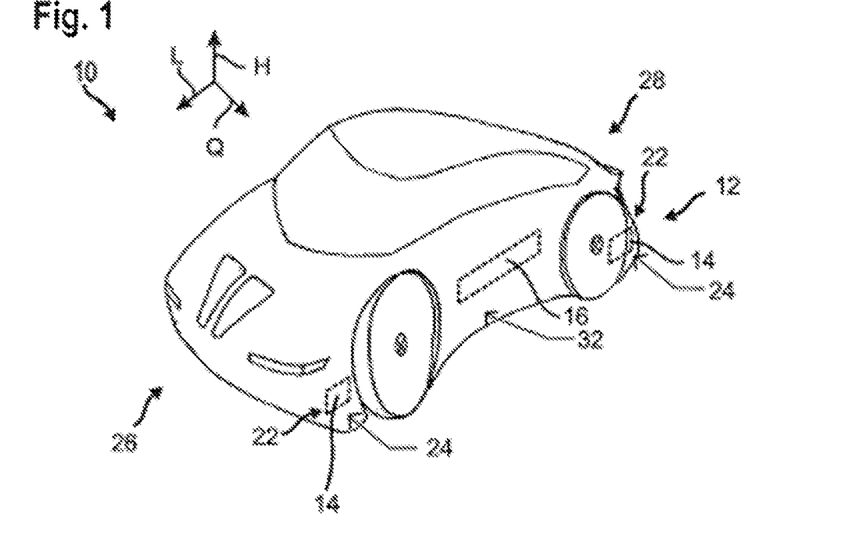
FIG. 1 shows a perspective view of a schematic illustration of a vehicle according to the invention with an electric energy storage device.

FIG. 1 shows a vehicle 10 according to the invention, which is an electric vehicle, also referred to as a "BEV" ("Battery Electric Vehicle"). However, in principle, the vehicle 10 may also be an only partially or temporarily electrically operated vehicle.

The vehicle 10 has an electric energy storage device 12, which comprises a first partial storage device 14 for electrical energy and a second partial storage device 16 for electrical energy.

Figure 3:
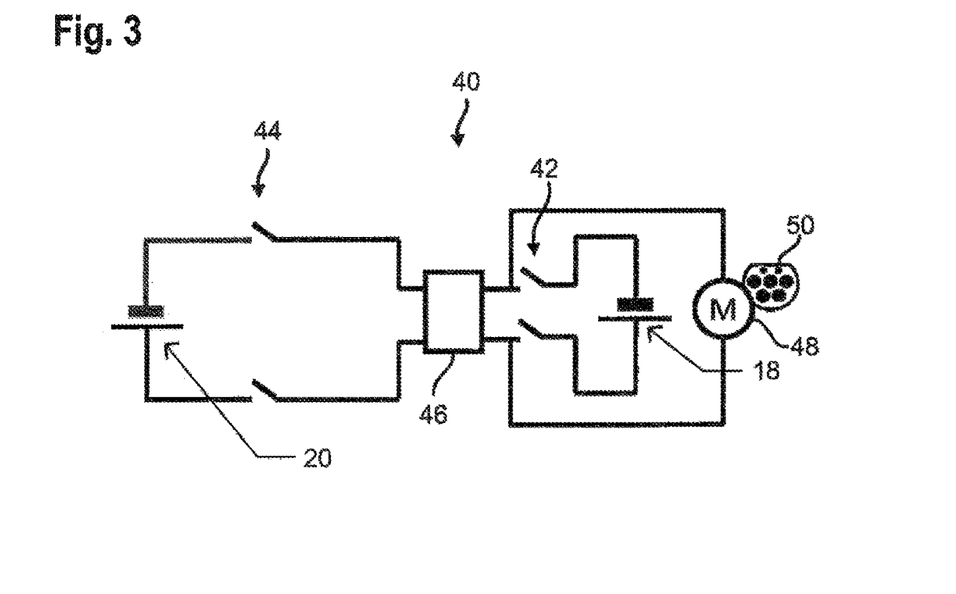
FIG. 3 shows a basic circuit diagram of a switching arrangement of the electric energy storage device from FIG. 1, which describes a first operating mode of the switching arrangement.

Both the first partial storage device 14 and the second partial storage device 16 have at least one electrochemical storage cell 18 and, respectively, 20 (cf. FIG. 3). However, in order to achieve a desired total capacity and a desired voltage of the electric energy storage device 12, the first partial storage device 14 and/or the second partial storage device 16 usually comprises/comprise a large number of storage cells 18 and, respectively, 20 (cf. FIG. 6), which are connected to each other in series and/or in parallel.

The cell chemistry in the storage cells 18 and, respectively, 20, that is to say the chemical composition of the components used in the storage cells 18 and, respectively, 20 is different.

The storage cells 18 of the first partial storage device 14 have a stability-optimized cell chemistry, that is to say a cell chemistry that is distinguished by a high cycle stability and high intrinsic safety.

In the illustrated embodiment, the storage cells 18 have an electrode with lithium iron phosphate ($LiFePO_4$, also referred to as "LFP") as the cathode active material. LFP is distinguished particularly by its intrinsic safety, so that no so-called "thermal runaway" can be expected even in the case of mechanical damage to a storage cell 18 with LFP as the cathode active material.

In principle, the storage cell 18 of the first partial storage device 14 can also have a different stability-optimized cell chemistry, for example the cathode active material can be another compound with an olivine structure.

However, the storage cells 20 of the second partial storage device 16 have a power-optimized cell chemistry, that is to say a cell chemistry which is distinguished by a high energy density.

In the embodiment shown, the storage cells 20 have an electrode with nickel manganese cobalt oxide (also referred to as "NMC"). NMC has a particularly high energy density and is available widely and throughout the world for use in electric energy storage devices for vehicles.

However, the storage cells 20 of the second partial storage device 16 can also have a different power-optimized cell chemistry, for example use a different layered oxide as the cathode active material, such as nickel cobalt aluminum oxide (also referred to as "NCA").

In the embodiment shown, the first partial storage device 14 comprises a plurality of subunits 22. The subunits 22 are arranged distributed spatially within the vehicle 10.

As an alternative, it goes without saying that the subunits 22 can also be arranged spatially close to one another within the vehicle, for example can be present in a common casing.

Two of the subunits 22, illustrated in FIG. 1, of the first partial storage device 14 are arranged in impact arrangements 24 of the vehicle 10, wherein a first subunit 22 is provided close to a front 26 of the vehicle 10 and a second subunit 22 is provided close to a rear 28 of the vehicle 10.

In other words, the subunits 22 of the first partial storage device 14 are accommodated in components of the vehicle 10 which would be expected to mechanically deform in the event of an accident. Components of this kind are therefore also referred to as crash-relevant components.

On account of the stability-optimized cell chemistry used in the storage cells 18 of the first partial storage device 14, no thermal runaway of the storage cells 18 is to be expected in such a case either.

However, the second partial storage device 16 is arranged close to a vehicle underbody 30 in a section 32 which is not intended to undergo any mechanical deformation in the event of an accident either.

Figure 2:
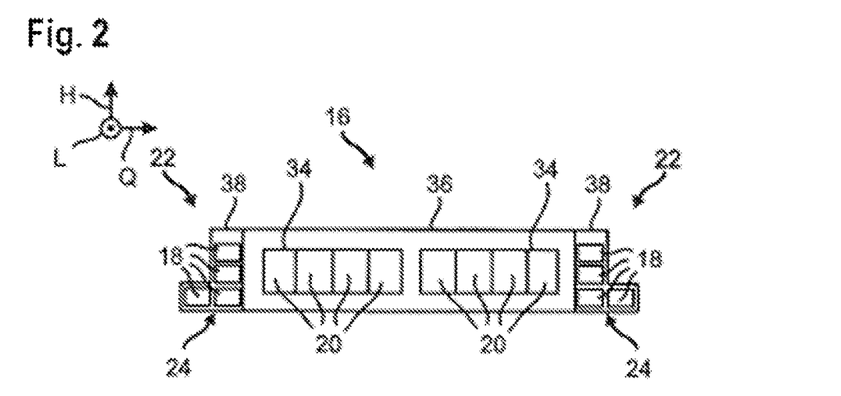
FIG. 2 shows a schematic sectional view through a second partial storage device of the electric energy storage device from FIG. 1.

FIG. 2 shows a cross section through the second partial storage device 16 along a vehicle transverse direction Q.

The second partial storage device 16 has a plurality of subunits 34, which each have a large number of storage cells 20 of the second partial storage device 16 and are configured as cell modules.

The subunits 34 are arranged within a battery casing 36 of the second partial storage device 16.

The battery casing 36 additionally has side sills 38 which are in the form of hollow profiles and extend over substantially the entire length of the battery casing 36 on opposite side faces of the battery casing 36 parallel to a vehicle longitudinal direction L.

The side sills 38 serve as an additional impact arrangement 24 which can undergo mechanical deformation when an accident occurs, without a mechanical load on the storage cells 20 of the second partial storage device 16.

Further subunits 22 of the first partial storage device 14 are provided within the side sill 38, i.e., a plurality of storage cells 18 of the first partial storage device 14 are arranged in the hollow profile of the side sill 38.

In principle, the storage cells 18 of the first partial storage device 14 can be arranged in various cavities or intermediate spaces of impact arrangements 24 of the vehicle 10.

Therefore, the vehicle 10 according to the invention can achieve optimum utilization of existing installation space in respect of the achievable total capacity of the electric energy storage device 12, without the intrinsic safety of the electric energy storage device being adversely affected.

The first partial storage device and the second partial storage device are electrically interconnected to each other by means of a switching arrangement 40, with a basic circuit diagram of the switching arrangement 40, which describes a first operating mode of the switching arrangement 40, being illustrated in FIG. 3.

The switching arrangement 40 comprises a first switching device 42, a second switching device 44 and a DC/DC converter 46.

The first switching device 42 serves to connect and disconnect the storage cells 18 of the first partial storage device 14 (cf. FIG. 1) and the second switching device 44 for connecting and disconnecting the storage cells 20 of the second partial storage device 16.

FIG. 3 shows in each case only one single storage cell 18 and, respectively, 20, for simplified illustration. It goes without saying that a plurality of storage cells 18 and, respectively, 20, which are interconnected with each other in series and/or in parallel, can be present.

Furthermore, a load 48, an electric motor M in FIG. 3, which is designed to drive the vehicle 10, and a charge source 50, a schematically illustrated charging connection in FIG. 3, are provided.

Provided that the first switching device 42 is connected, either current is discharged from the storage cells 18 to the electric motor M, that is to say the storage cells 18 are discharged, or current is supplied to the storage cells 18 via the charge source 50, that is to say the storage cells 18 are charged.

If the storage cell 20 of the second partial storage device 16 is connected by means of the second switching device 44, the voltage level of the second partial storage device is converted to the voltage level of the first storage cell 18 by means of the DC/DC converter 46. As a result, it is possible for the second partial storage device 16 to be used as a range extender of the first partial storage device 14.

However, in this variant, it is also conceivable in principle for the storage cell 18 of the first partial storage device 14 to be disconnected via the first switching device 42 and for the storage cell 20 of the second partial storage device 16 to be connected via the second switching device 44.

Figure 4:
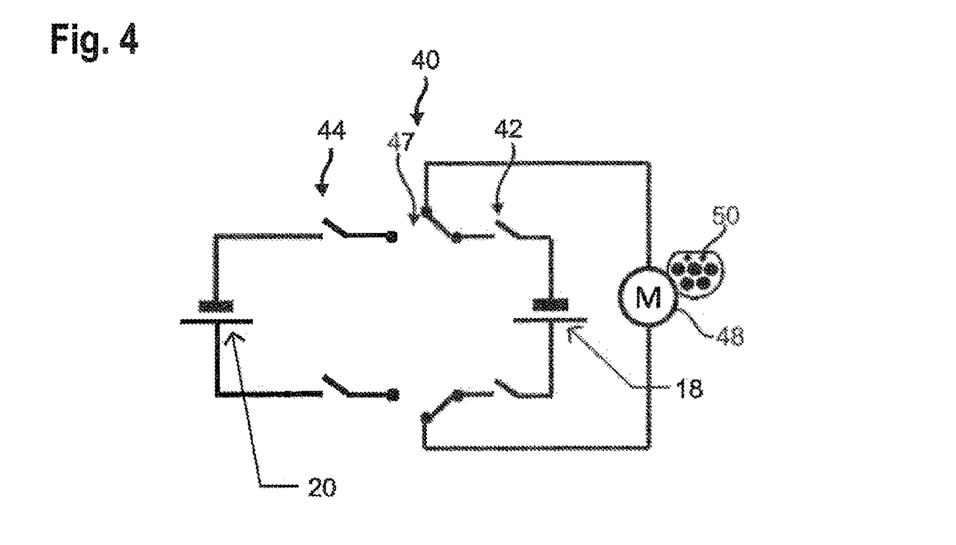
FIG. 4 shows a basic circuit diagram of the switching arrangement of the electric energy storage device from FIG. 1, which describes a second operating mode of the switching arrangement.

FIG. 4 shows a basic circuit diagram of the switching arrangement 40 which describes a second operating mode of the switching arrangement 40.

In this variant, the first switching device 42 and the second switching device 44 are connected to the load 48 and, respectively, to the charge source 50 via a third switching device 47, with either the storage cell 18 of the first partial storage device 14 or the storage cell 20 of the second partial storage device 16 being connected to the load 48 or the charge source 50.

In other words, the power provided by the electric energy storage device 12 is provided solely by the first partial storage device 14 or by the second partial storage device 16 in the second operating mode of the switching arrangement 40.

Figure 5:
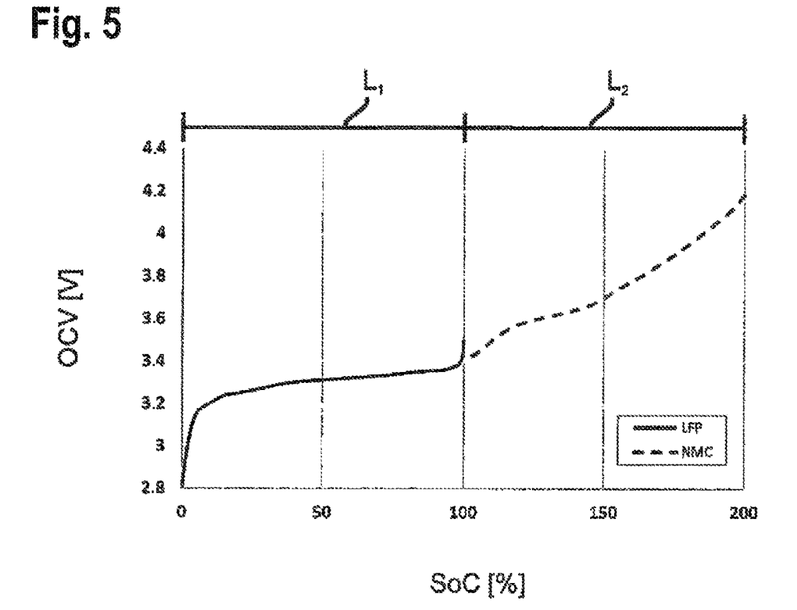
FIG. 5 shows a charging curve of the electric energy storage device during operation of the switching arrangement in the second operating mode.

FIG. 5 shows an exemplary charging curve, as can be achieved with the design of the switching arrangement 40 according to FIG. 4.

The charging curve shows the profile of the open-circuit voltage OCV depending on the state of charge (SoC). As can be seen, only the storage cell 18 of the first partial storage device 14 is charged in a first charge range L1, whereas only the storage cell 20 of the second partial storage device 16 is charged in a second charge range L2.

The difference between the charge ranges L1 and L2 is additionally illustrated in FIG. 5 by way of the SoC being illustrated in the range of from 0 to 200%, with only the storage cell 18 being fully charged given an SoC of 100% and the storage cell 20 being fully charged only given an SoC of 200%.

It is additionally clear from FIG. 5 that a flat charging curve is produced in the first charge range L1 when LFP is used, that is to say only slight changes in the voltage can be observed over wide parts of the charge range L1 depending on the SoC, as can be seen particularly in comparison to the steeper profile of the charging curve in the second charge range L2.

Owing to the flat profile of the charging curve, reliable determination of the current SoC is made more difficult. The combination of stability-optimized and power-optimized cell chemistry allows calibration of an estimator (not illustrated), used for state of charge determination, to be performed at the transition between the first and the second charge range L1 and, respectively, L2 or in the second charge range L2.

Figure 6:
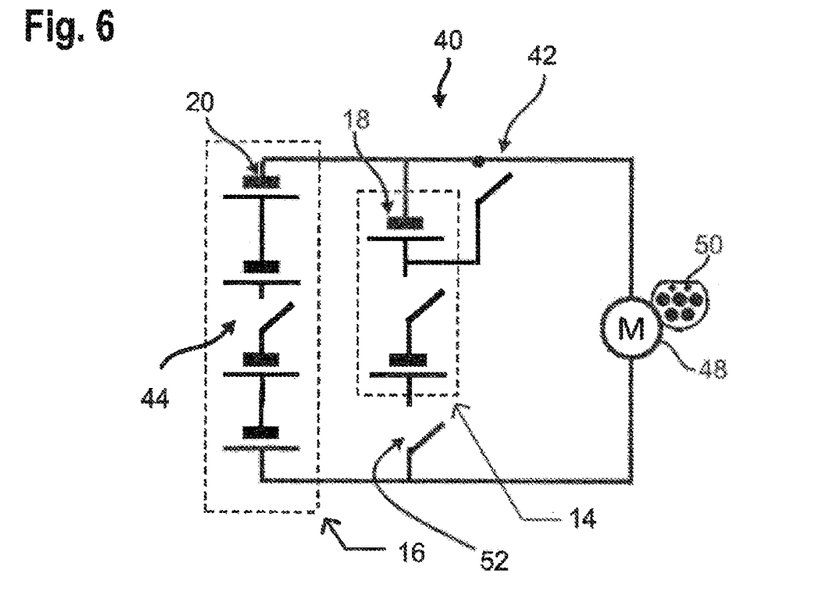
FIG. 6 shows a basic circuit diagram of the switching arrangement of the electric energy storage device from FIG. 1, which describes a third operating mode of the switching arrangement.

FIG. 6 shows a basic circuit diagram of the switching arrangement 40 which describes a third operating mode of the switching arrangement 40.

In this variant, the first partial storage device 14 and the second partial storage device 16 are interconnected with each other in parallel. Furthermore, the first partial storage device 14 and the second partial storage device 16 have a plurality of storage cells 18 and, respectively, 20 interconnected to each other in series, with the respective number of storage cells 18 and, respectively, 20 being selected such that the charge-discharge curves of the two partial storage devices 14 and 16 intersect.

Figure 7:
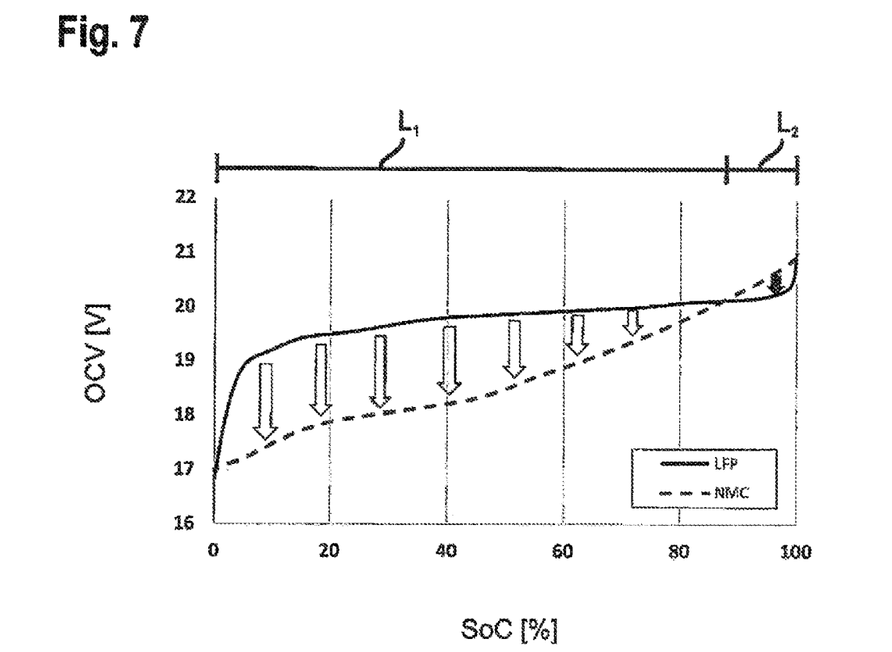
FIG. 7 shows a charging curve of the electric energy storage device during operation of the switching arrangement in the third operating mode.

This is shown by way of example in FIG. 7, which shows the profile of a charging curve of six storage cells 18 which are interconnected to each other in series and are based on LFP and a charging curve of five storage cells 20 which are interconnected to each other and are based on NMC. The voltage difference between the charging curves decreases as the SoC increases, initially down to a point of intersection and then further, as illustrated by arrows in FIG. 7. The point of intersection is situated at an SoC of approximately 89%.

Therefore, the electric energy storage device 12 can be operated on the basis of a composite charge-discharge curve, with the resulting charge-discharge curve being specified by the storage cells 18 of the first partial storage device 14 in the charge range L1 and by the storage cells 20 of the second partial storage device 16 in the charge range L2.

Owing to the profile, shown in FIG. 7, of the charging curves, it is clear that the first partial storage device 14 specifies only the start, but not the end, of the resulting charging curve and the second partial storage device 16 specifies only the end, but not the start, of the resulting charging curve. In this way, the number of phase transitions to which the respective cell chemistry of the first partial storage device 14 or the second partial storage device 16 is subjected in the case of repeated charging and discharging processes can be reduced since at most one phase transition for each cell chemistry can be expected for each charging/discharging cycle.

The circuit arrangement 40 shown in FIG. 6 additionally has a fourth switching device 52, which can connect the series circuit comprising the storage cells 18 of the first partial storage device 14 to the load 48 or to the charge source 50 and to the second partial storage device 16 which is connected in parallel, or can disconnect it from these.

As an alternative, only an individual storage cell 18 can also be connected by means of the first switching device 42.

It goes without saying that the number of storage cells 18 which are connected to each other in series and can be connected by means of the first switching device 42 can also be higher than shown in FIG. 6.

What is claimed is:

1. A vehicle with an electric energy storage device, including a first partial storage device for electric energy and a second partial storage device for electric energy,
wherein the first partial storage device and the second partial storage device are electrically interconnected with each other by a switching arrangement,
wherein the first partial storage device and the second partial storage device each comprise at least one electrochemical storage cell,
wherein the at least one electrochemical storage cell of the first partial storage device has a stability-optimized cell chemistry, and the at least one electrochemical storage cell of the second partial storage device has a power-optimized cell chemistry, and
wherein the at least one electrochemical storage cell of the first partial storage device is arranged in an impact arrangement of the vehicle,
wherein the electric energy storage device has an assembled charge-discharge curve when the switching arrangement is in a third operating mode, and
wherein the assembled charge-discharge curve has a first charge range, in which the power of the electric energy storage device is specified by the first partial storage device, and a second charge range, in which the power of the electric energy storage device is specified by the second partial storage device.

2. The vehicle according to claim 1, wherein the impact arrangement has a cavity or intermediate space in which the at least one electrochemical storage cell of the first partial storage device is arranged.

3. The vehicle according to claim 1, wherein the impact arrangement is a side sill of a battery casing of the second partial storage device.

4. The vehicle according to claim 2, wherein the impact arrangement is a side sill of a battery casing of the second partial storage device.

5. The vehicle according to claim 1, wherein the at least one electrochemical storage cell of the first partial storage device has an electrode containing a cathode active material which comprises a compound with an olivine structure including lithium iron phosphate.

6. The vehicle according to claim 2, wherein the at least one electrochemical storage cell of the first partial storage device has an electrode containing a cathode active material which comprises a compound with an olivine structure including lithium iron phosphate.

7. The vehicle according to claim 3, wherein the at least one electrochemical storage cell of the first partial storage device has an electrode containing a cathode active material which comprises a compound with an olivine structure including lithium iron phosphate.

8. The vehicle according to claim 4, wherein the at least one electrochemical storage cell of the first partial storage device has an electrode containing a cathode active material which comprises a compound with an olivine structure including lithium iron phosphate.

9. The vehicle according claim 1, wherein the at least one electrochemical storage cell of the second partial storage device has an electrode containing a cathode active material which comprises a compound with a layer structure including nickel manganese cobalt oxide or nickel cobalt aluminum oxide.

10. The vehicle according claim 2, wherein the at least one electrochemical storage cell of the second partial storage device has an electrode containing a cathode active material which comprises a compound with a layer structure including nickel manganese cobalt oxide or nickel cobalt aluminum oxide.

11. The vehicle according claim 3, wherein the at least one electrochemical storage cell of the second partial storage device has an electrode containing a cathode active material which comprises a compound with a layer structure including nickel manganese cobalt oxide or nickel cobalt aluminum oxide.

12. The vehicle according to claim 1, wherein a ratio of a capacity of the first partial storage device to a capacity of the second partial storage device lies in a range of from 1:1.5 to 1:15.

13. The vehicle according to claim 2, wherein a ratio of a capacity of the first partial storage device to a capacity of the second partial storage device lies in a range of from 1:1.5 to 1:15.

14. The vehicle according to claim 3, wherein a ratio of a capacity of the first partial storage device to a capacity of the second partial storage device lies in a range of from 1:1.5 to 1:15.

15. The vehicle according to claim 1, wherein the second partial storage device is a range extender of the first partial storage device when the switching arrangement is in a first operating mode.

16. The vehicle according to claim 2, wherein the second partial storage device is a range extender of the first partial storage device when the switching arrangement is in a first operating mode.

17. The vehicle according to claim 3, wherein the second partial storage device is a range extender of the first partial storage device when the switching arrangement is in a first operating mode.

18. The vehicle according claim 1, wherein the electric energy storage device is designed such that power provided by the electric energy storage device is provided solely by the first partial storage device or solely by the second partial storage device when the switching arrangement is in a second operating mode.

19. The vehicle according claim 2, wherein the electric energy storage device is designed such that power provided by the electric energy storage device is provided solely by the first partial storage device or solely by the second partial storage device when the switching arrangement is in a second operating mode.

* * * * *